(12) United States Patent
Kellerman

(10) Patent No.: US 10,361,547 B2
(45) Date of Patent: Jul. 23, 2019

(54) MOUNTING CLIP FOR ELECTRICAL OR COMMUNICATION DEVICE

(71) Applicant: Cablofil, Inc., Mascoutah, IL (US)

(72) Inventor: Dallas Kellerman, Belleville, IL (US)

(73) Assignee: CABLOFIL, INC., Mascoutah, IL (US)

( * ) Notice: Subject to any disclaimer, the term of this patent is extended or adjusted under 35 U.S.C. 154(b) by 0 days.

(21) Appl. No.: 15/250,133

(22) Filed: Aug. 29, 2016

(65) Prior Publication Data
US 2018/0062365 A1    Mar. 1, 2018

(51) Int. Cl.
*E04B 9/06* (2006.01)
*H02G 3/12* (2006.01)

(52) U.S. Cl.
CPC ............... *H02G 3/125* (2013.01); *E04B 9/06* (2013.01); *H02G 3/12* (2013.01)

(58) Field of Classification Search
CPC ......... Y10T 24/44615; Y10T 24/44624; Y10T 24/44; Y10T 24/44983; Y10T 24/449826; E04B 9/006; E04B 2001/405; E04G 25/00; H02G 3/12; H02G 3/32; H02G 3/083; H02G 3/123; H02G 3/125; H02G 3/126; H02G 1/00; Y10S 248/906; H01R 13/518; F21V 21/02; B60T 17/046; F16L 3/24; F16B 2/20
USPC ........ 248/200.1, 200, 201, 205.1, 300, 68.1, 248/56, 57, 906, 342, 343, 316.8, 298.1, 248/218.4, 340
See application file for complete search history.

(56) References Cited

U.S. PATENT DOCUMENTS

| | | | | |
|---|---|---|---|---|
| 4,967,990 A * | 11/1990 | Rinderer | ................ | H02G 3/125 220/3.9 |
| 7,472,875 B2 * | 1/2009 | Rinderer | ................ | H02G 3/125 220/3.3 |
| 8,403,277 B2 * | 3/2013 | Nuernberger | .......... | H02G 3/125 174/58 |
| 8,403,289 B1 * | 3/2013 | Rinderer | ................ | H02G 3/126 174/480 |
| 8,702,047 B2 * | 4/2014 | Nuernberger | .......... | H02G 3/125 174/58 |
| 8,800,943 B2 * | 8/2014 | Long | ........................ | F04D 25/08 248/200.1 |
| 9,022,326 B2 * | 5/2015 | Brown | ....................... | F16L 3/08 138/103 |
| 9,252,579 B2 * | 2/2016 | Korcz | ..................... | H02G 3/081 |
| 9,444,236 B2 * | 9/2016 | Witherbee | .............. | H02G 3/126 |
| 2010/0006723 A1 * | 1/2010 | Yan | ......................... | H02G 3/125 248/201 |

(Continued)

*Primary Examiner* — Nkeisha Smith
(74) *Attorney, Agent, or Firm* — Bryan Cave Leighton PaisnerLLP

(57) ABSTRACT

A box mounting clip for mounting a junction box on a stud mounting bracket includes a base having a front face, a rear face, an upper edge margin, a lower edge margin, a left edge margin, and a right edge margin. A top flange extends forward from the upper edge margin and a bottom flange extends forward from the lower edge margin. The top and bottom flanges are configured to receive a stud mounting bracket therebetween. A positioning tab extends generally forward from the base at an angle and is configured to prevent rotation of the box mounting clip relative to the stud mounting bracket when the stud mounting bracket is received between the top and bottom flanges.

5 Claims, 8 Drawing Sheets

(56) References Cited

U.S. PATENT DOCUMENTS

| | | | |
|---|---|---|---|
| 2010/0270446 A1* | 10/2010 | Phillips | H05K 5/0204 |
| | | | 248/201 |
| 2013/0264434 A1* | 10/2013 | Unno | G03B 21/14 |
| | | | 248/58 |
| 2014/0263865 A1* | 9/2014 | Salian | H02G 3/121 |
| | | | 248/49 |
| 2016/0126711 A1* | 5/2016 | Colangelo | F16B 2/22 |
| | | | 220/3.3 |
| 2016/0334056 A1* | 11/2016 | Nikayin | F16M 13/022 |

\* cited by examiner

US 10,361,547 B2

MOUNTING CLIP FOR ELECTRICAL OR COMMUNICATION DEVICE

FIELD OF THE DISCLOSURE

The present disclosure generally relates to a mounting clip for mounting an electrical or communication device on a wall stud mounting bracket.

BACKGROUND

Typically, an electrical or communication device is installed in a building using a mounting bracket. The electrical or communication device is fastened to the mounting bracket, and in turn, the mounting bracket is fastened to framing (e.g., a wall stud). In some circumstances, junction boxes are used to house and protect electrical and communication devices, such as electrical outlets, electrical switches, associated electrical wiring, communication terminals (e.g., terminals for fiber optics), and associated communication cables (e.g., optical fiber cables). The junction box is secured to the mounting bracket, so that, in turn, the electrical or communication device is secured to the mounting bracket.

SUMMARY OF THE DISCLOSURE

In one aspect, a box mounting clip for mounting a junction box on a stud mounting bracket includes a base having a front face, a rear face, an upper edge margin, a lower edge margin, a left edge margin, and a right edge margin. A top flange extends forward from the upper edge margin and a bottom flange extends forward from the lower edge margin. The top and bottom flanges are configured to receive a stud mounting bracket therebetween. A positioning tab extends generally forward from the base at an angle and is configured to prevent rotation of the box mounting clip relative to the stud mounting bracket when the stud mounting bracket is received between the top and bottom flanges.

In another aspect, a box mounting clip for mounting a junction box on a stud mounting bracket includes a base having a front face, a rear face, an upper edge margin, a lower edge margin, a left edge margin, and a right edge margin. A top flange extends forward from the upper edge margin and a bottom flange extends forward from the lower edge margin. The top and bottom flanges are configured to receive a stud mounting bracket therebetween. An upper attachment flange extends upward from the top flange and a lower attachment flange extends downward from the bottom flange. The upper and lower attachment flanges each have an opening. The upper and lower attachment flanges are configured for attachment to a junction box to mount the junction box on the stud mounting bracket.

In another aspect, a stud mounting bracket assembly includes a stud mounting bracket having a lip. The stud mounting bracket assembly includes a box mounting clip for mounting a junction box on the stud mounting bracket. The box mounting clip includes a base having a front face, a rear face, an upper edge margin, a lower edge margin, a left edge margin, and a right edge margin. A top flange extends forward from the upper edge margin and a bottom flange extends forward from the lower edge margin. The top and bottom flanges are configured to receive the stud mounting bracket therebetween. A left positioning tab extends generally forward from the left edge margin of the base at an angle. A right positioning tab extends generally forward from the right edge margin of the base at an angle. The left and right positioning tabs are configured to engage the lip of the stud mounting bracket to prevent rotation of the box mounting clip relative to the stud mounting bracket when the stud mounting bracket is received between the top and bottom flanges.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 7:
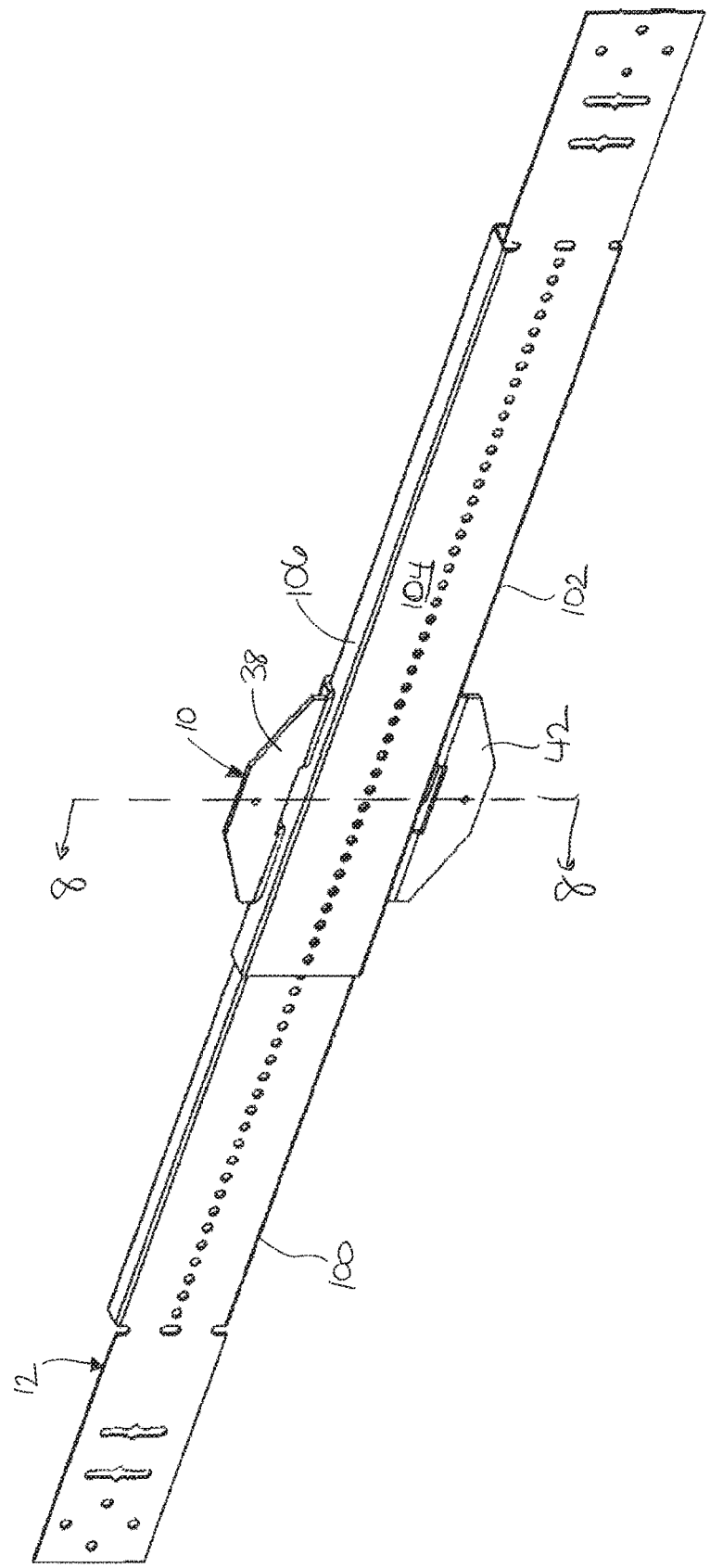
FIG. 7 is a perspective of a stud mounting bracket assembly including the box mounting clip and a stud mounting bracket, illustrating the box mounting clip attached to the stud mounting bracket.
Figure 8:
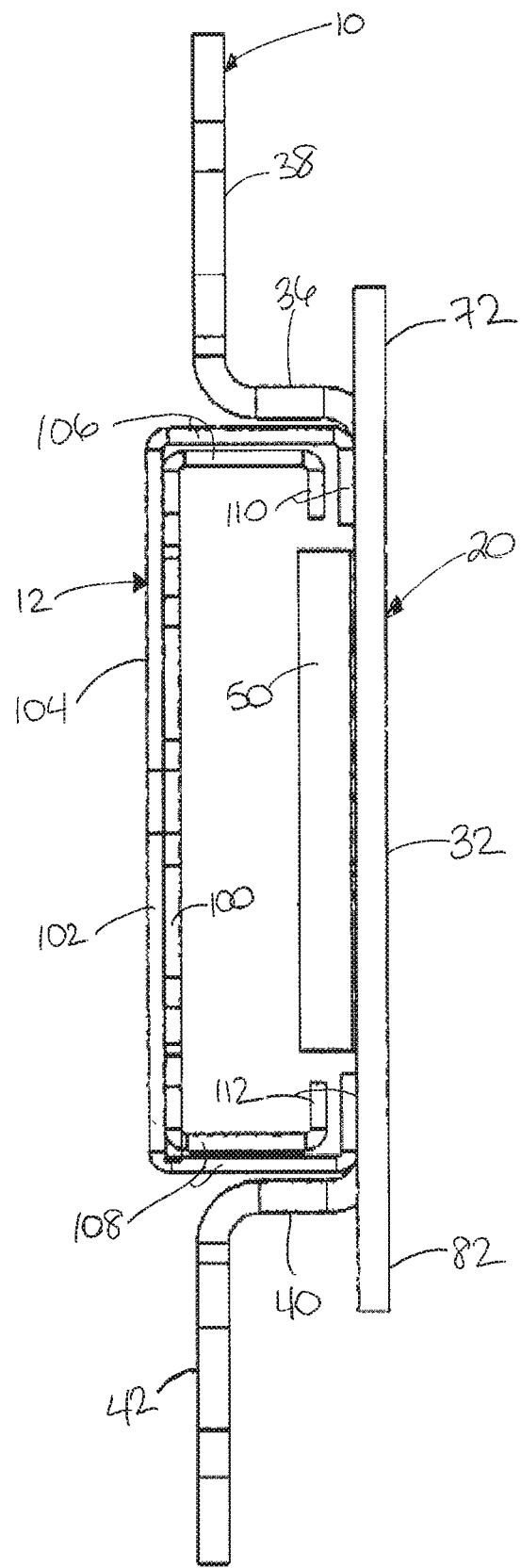
FIG. 8 is a section taken along line 8-8 of FIG. 7, illustrating the connection of the box mounting clip to the stud mounting bracket.
Figure 9:
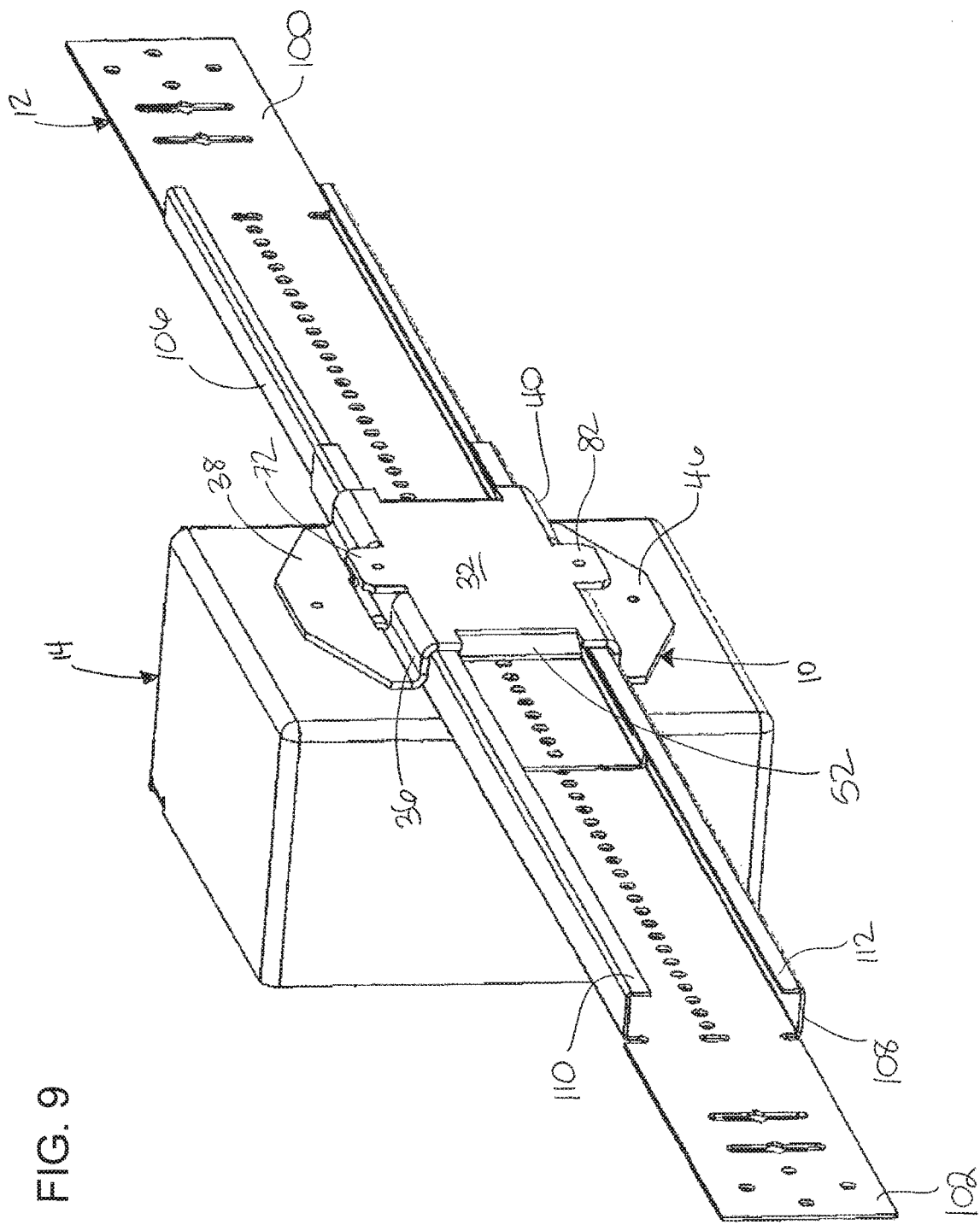
FIG. 9 is a rear perspective of a stud mounting bracket assembly including the box mounting clip, the stud mounting bracket, and a junction box, illustrating the box mounting clip mounting the junction box on the stud mounting bracket.

Referring generally to FIGS. 1-6, a box mounting clip for mounting an electrical or communication device or the like (broadly, a "junction box") on a stud mounting bracket extending between wall studs (e.g., metal wall studs) is generally indicated at reference numeral 10. In the illustrated embodiment, the box mounting clip 10 is a unitary, one-piece construction. The clip 10 may be formed from a single sheet metal (e.g., steel or aluminum) or other suitable material (e.g., plastic). In one embodiment, the clip 10 is formed from galvanized steel. The clip 10 can be molded, die-cast, or otherwise suitably formed. In FIGS. 7-9, the clip 10 is illustrated installed on a stud mounting bracket 12 configured to extend between wall studs (not shown) to mount a junction box 14 (FIG. 9) on the stud mounting bracket. It is understood that the clip 10 can be used with other mounting brackets or devices within the scope of the present invention. The orientation of the clip 10 in the drawings provides the point of reference for the terms defining relative locations and positions of structures and components, including but not limited to the terms "upper," "lower," "left," "right," "top," "bottom," "forward," and "rearward," as used throughout the present disclosure, and are intended for convenience of description, not to limit an invention disclosed herein or its components to any one positional or spatial orientation.

Referring to FIGS. 1-6, the box mounting clip 10 includes a base 20 that is generally rectangular having opposite upper and lower edge margins 22, 24, opposite left and right edge margins 26, 28, a front face 30, and a rear face 32. A top flange 36 extends generally horizontally forward from the upper edge margin 22 of the base 20. An upper attachment flange 38 extends generally vertically upward from the top flange 36. A bottom flange 40 extends generally horizontally forward from the lower edge margin 24 of the base 20. A lower attachment flange 42 extends generally vertically downward from the bottom flange 40. The upper and lower attachment flanges 38, 42 are generally co-planar. The top and bottom flanges 36, 40 are generally perpendicular to the base 20 of the clip 10. The upper and lower attachment flanges 38, 42 are generally parallel to the base 20 of the clip 10. Each of the upper and lower attachment flanges 38, 42 includes an opening 44, 46, respectively, for receiving a fastener to attach a junction box 14 to the clip 10.

Referring still to FIGS. 1-6, the box mounting clip 10 includes at least one positioning tab. In the illustrated embodiment, the box mounting clip 10 includes positioning tabs 50, 52. A portion of the left edge margin 26 extends (e.g., is bent) forward from the base 20 to form the left positioning tab 50. The left positioning tab 50 is defined by upper and lower slits 54, 56 extending inward from the left edge margin 26 (i.e., toward the right edge margin 28) of the base 20. The slits 54, 56 are spaced from the upper and lower edge margins 22, 24 of the base 20, such that a portion of the left edge margin 26 remains co-planar with the remainder of the base 20. In the illustrated embodiment, the positioning tab 50 is generally centered vertically along the left edge margin 26. In the illustrated embodiment, the slits 54, 56 each extend generally perpendicular to the left edge margin 26.

Similarly, a portion of the right edge margin 28 extends (e.g., is bent) forward from the base 20 to form the right positioning tab 52. The right positioning tab 52 is defined by upper and lower slits 58, 60 extending inward from the right edge margin 28 (i.e., toward the left edge margin 26) of the base 20. The slits 58, 60 are spaced from the upper and lower edge margins 22, 24 of the base 20, such that a portion of the right edge margin 28 remains co-planar with the remainder of the base 20. In the illustrated embodiment, the positioning tab 52 is generally centered vertically along the right edge margin 28. In the illustrated embodiment, the slits 58, 60 each extend generally perpendicular to the right edge margin 28. It is understood that other configurations are within the scope of the present invention. For example, some or all of the slits defining the positioning tabs need not be perpendicular to the left and right edge margins, but could instead be at a non-perpendicular angle relative to the edge margins.

Figure 1:
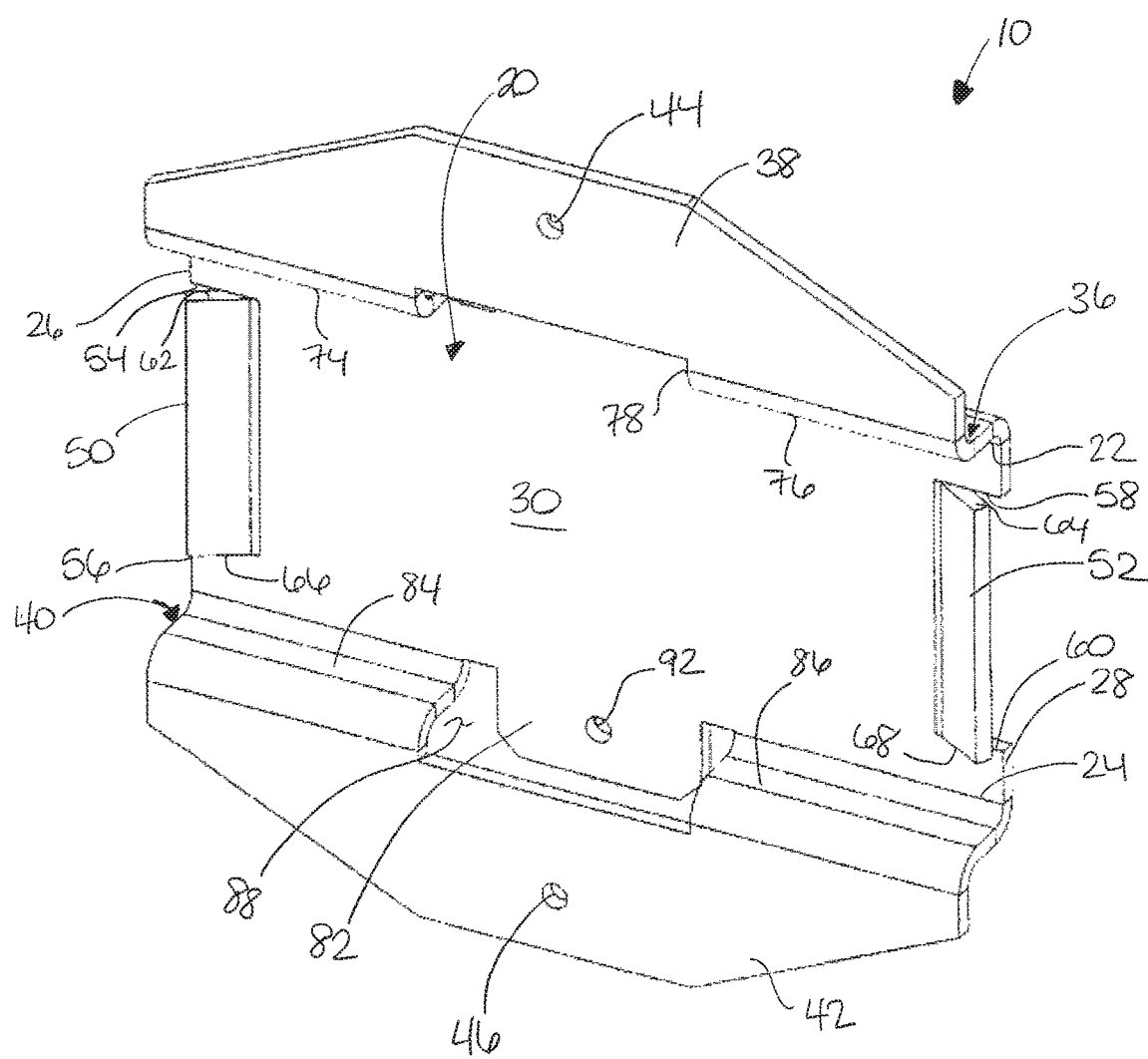
FIG. 1 is a perspective of a box mounting clip for mounting a junction box on a stud mounting bracket.
Figure 2:
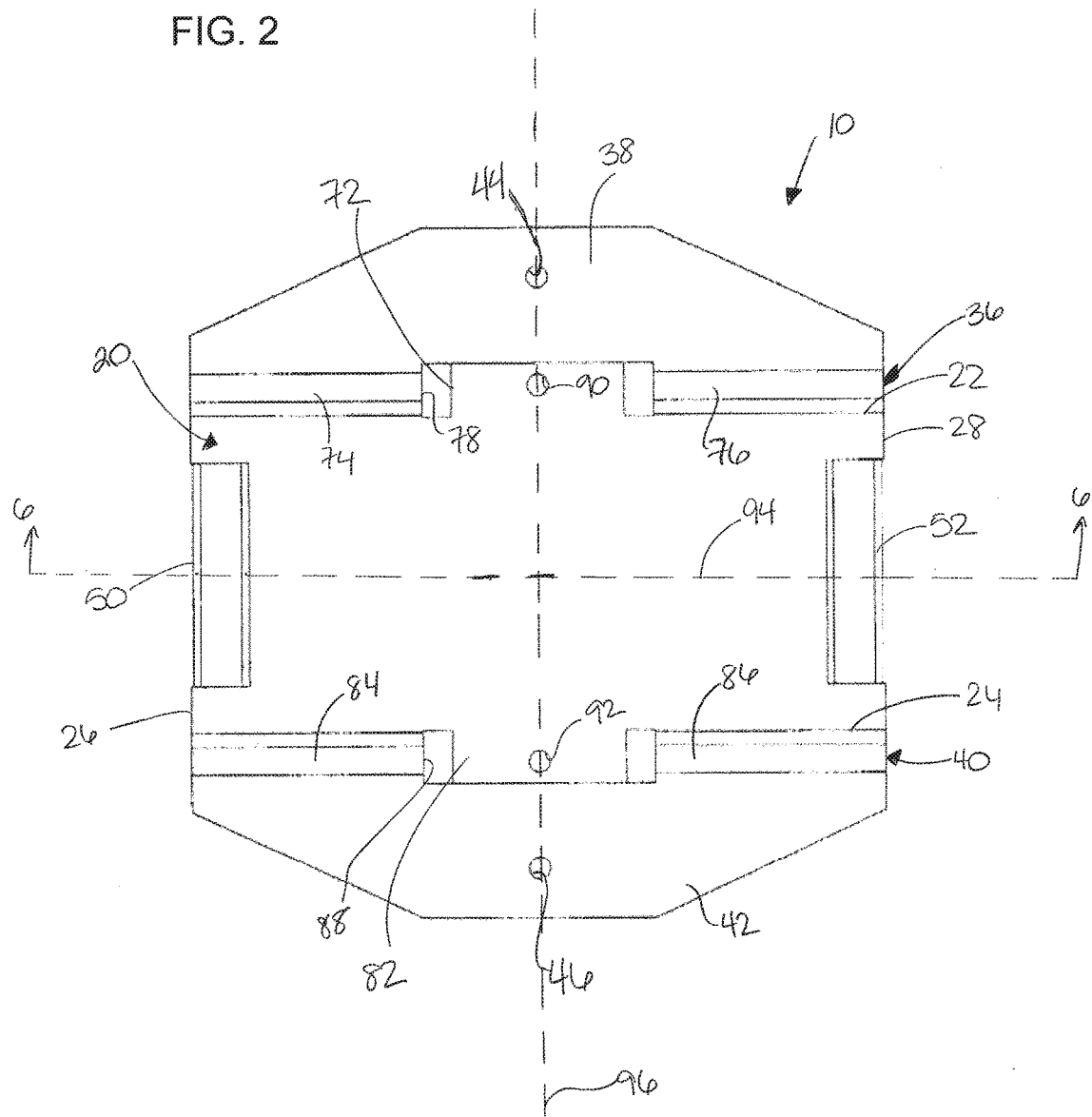
FIG. 2 is a front elevation of the box mounting clip of FIG. 1.
Figure 3:
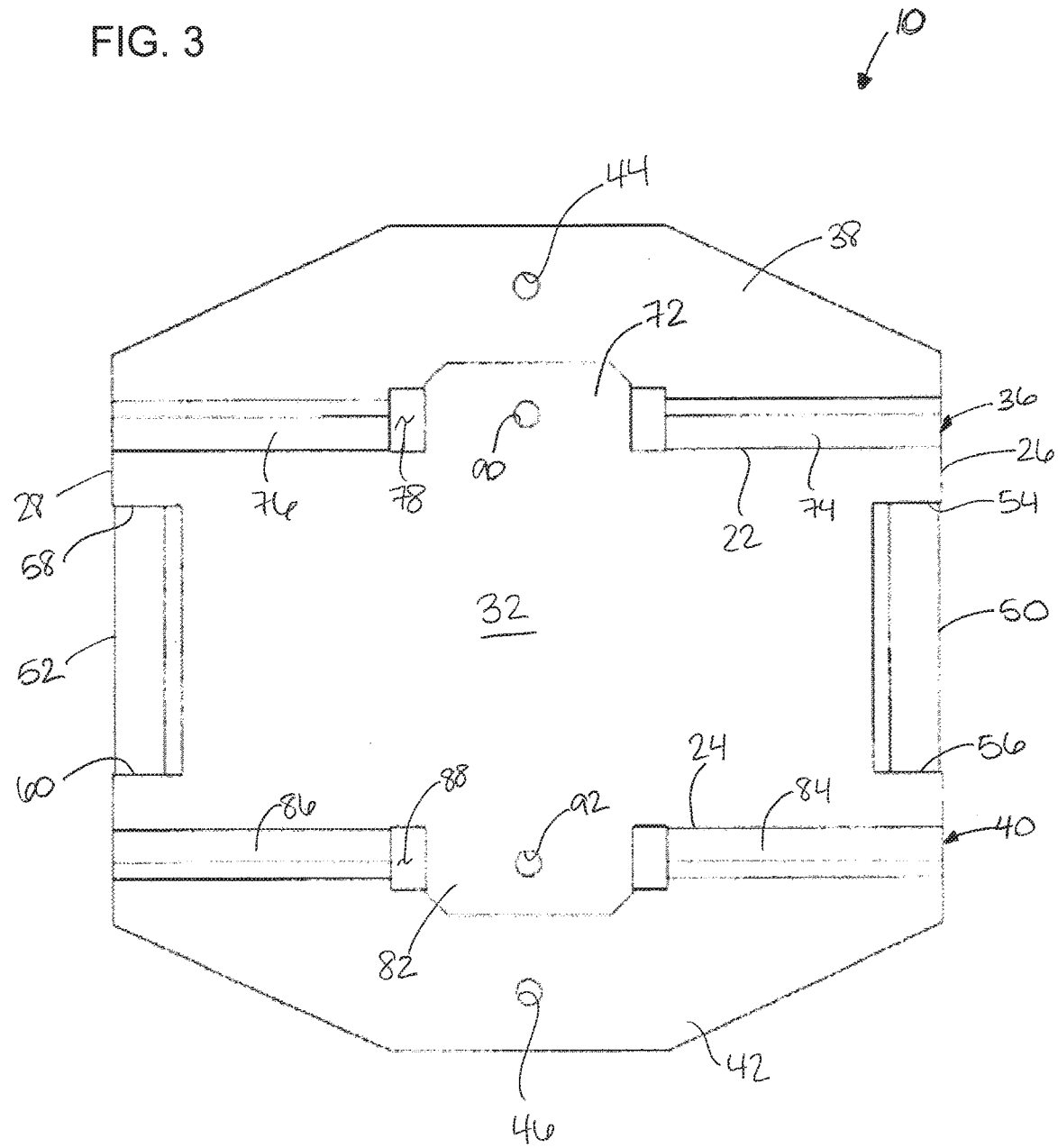
FIG. 3 is a rear elevation of the box mounting clip of FIG. 1.
Figure 4:
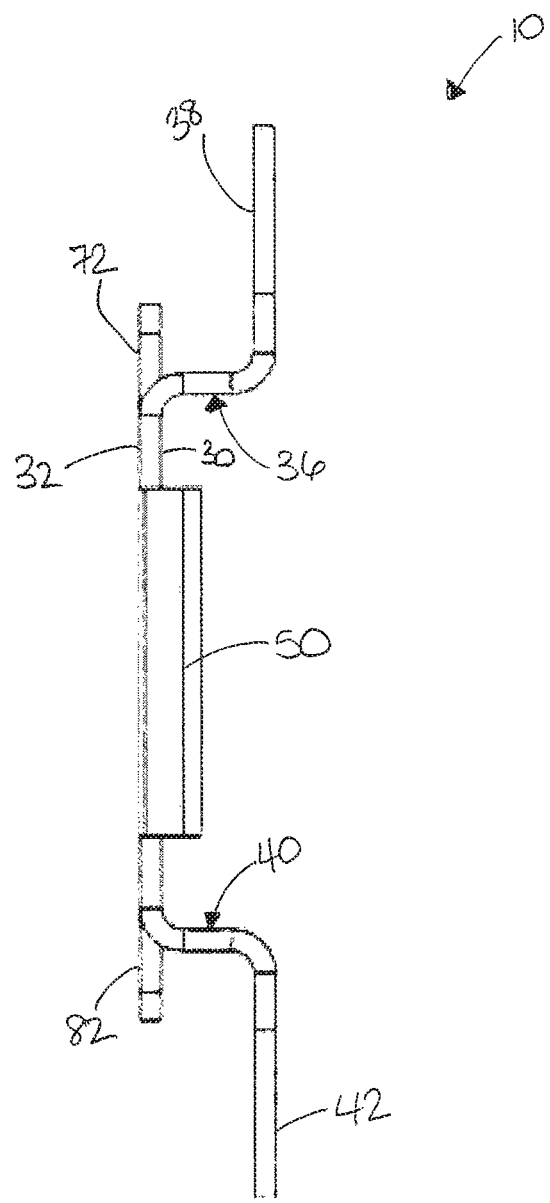
FIG. 4 is a left side elevation of the box mounting clip, the right side elevation being a mirror image thereof.
Figure 5:
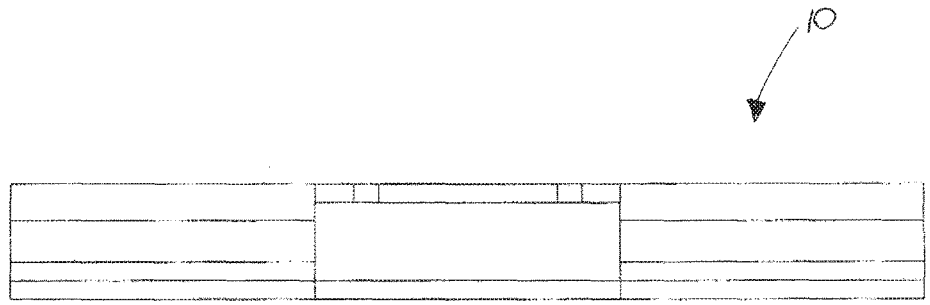
FIG. 5 is a top plan of the box mounting clip, the bottom plan being a mirror image thereof.
Figure 6:
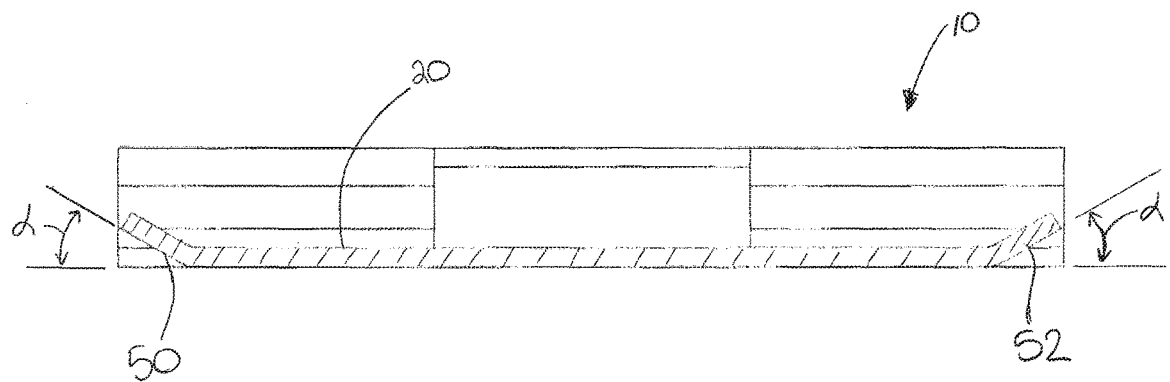
FIG. 6 is a section taken along line 6-6 of FIG. 2, illustrating angled positioning tabs of the box mounting clip.

The positioning tabs 50, 52 extend at an angle $\alpha$ relative to the base 20 (FIG. 6). For example, the positioning tabs 50, 52 can extend at a non-perpendicular angle relative to the base 20, as illustrated. In one embodiment, the positioning tabs 50, 52 extend at an angle $\alpha$ relative to the base 20 that is less than 180 degrees and more than 0 degrees. For example, in one embodiment, the positioning tabs 50, 52 extend at an angle $\alpha$ of approximately 30 degrees relative to the base 20. Alternatively, the positioning tabs 50, 52 can extend perpendicular to the base 20. Other configurations are within the scope of the present invention. For example, the positioning tabs can extend at any angle relative to the base. Although the positioning tabs are illustrated as extending at the same angle $\alpha$, the left and right positioning tabs can extend at different angles relative to the base.

Each positioning tab 50, 52 is generally planar. Each positioning tab 50, 52 has an upper 62, 64 and a lower surface 66, 68. The positioning tabs 50, 52 are configured to limit rotation of a junction box 14 attached to a stud mounting bracket 12, as described in further detail below.

In other embodiments, the clip 10 can have fewer than two positioning tabs (e.g., one positioning tab or no positioning tabs), or more than two positioning tabs. Although the positioning tabs are illustrated as portions of the side edge margins bent forward from the base of the clip, other configurations are within the scope of the present invention. For example, at least one positioning tab can be struck from the base to extend forward for limiting rotation of the clip.

Referring still to FIGS. 1-6, the base 20 optionally includes an upper mounting tab 72 extending upward from the upper edge margin 22. As shown in the drawings, the upper mounting tab 72 is generally centered horizontally along the upper edge margin 22. As illustrated, the upper mounting tab 72 can be coplanar with the base 20. In the illustrated embodiment, the top flange 36 includes left and right legs 74, 76 extending forward from the base 20 at the upper edge margin 22 and spaced from each other by a gap 78. The upper mounting tab 72 extends upward from the upper edge margin 22 between the left and right legs 74, 76 of the top flange 36. The legs 74, 76 of the top flange 36 can be connected by the upper attachment flange 38.

Similarly, the base 20 optionally includes a lower mounting tab 82 extending downward from the lower edge margin 24. As shown in the drawings, the lower mounting tab 82 is generally centered along the lower edge margin 24. As illustrated, the lower mounting tab 82 can be coplanar with the base 20. In the illustrated embodiment, the bottom flange 40 includes left and right legs 84, 86 extending forward from the base 20 at the lower edge margin 24 and spaced from each other by a gap 88. The lower mounting tab 82 extends downward from the lower edge margin 24 between the left and right legs 84, 86 of the bottom flange 40. The legs 84, 86 of the bottom flange 40 can be connected by the lower attachment flange 42.

The mounting tabs 72, 82 are coplanar with the base 20. Each mounting tab 72, 82 includes an opening 90, 92 for receiving a fastener to attach a junction box 14 to the clip 10. The attachment flanges 38, 42 are positioned forward from the mounting tabs 72, 82. Other configurations are within the scope of the present invention. For example, in one embodiment the clip 10 does not include mounting tabs, and the top and bottom flanges are continuous along the entire length of the respective upper and lower edge margins of the base. Alternatively, the top and bottom flanges can be discontinuous as illustrated without the inclusion of mounting tabs.

In the illustrated embodiment, the box mounting clip 10 is generally symmetric about a central horizontal axis 94. In the illustrated embodiment, the clip 10 is generally symmetric about a central vertical axis 96. Thus, as illustrated, the clip 10 can be mounted to the stud mounting bracket 12 in any orientation (i.e., with either the top or bottom flanges 36, 40 oriented as the top, or with either the left or right positioning tabs 50, 52 oriented as the left). This decreases installation time, as a user does not need to determine a specific orientation before attaching the clip 10 to the stud mounting bracket 12. Other configurations are within the scope of the present invention, such as a box mounting clip that is not symmetric about either or both of the central horizontal and vertical axes.

Referring now to FIGS. 7-9, the box mounting clip 10 is configured to mount a junction box 14 (e.g., a universal electrical box, a data box, etc.) to a front face of a stud mounting bracket 12 mounted to wall studs. In the illustrated embodiment, the stud mounting bracket 12 is a telescoping bracket having inner and outer telescoping bars 100, 102.

The stud mounting bracket 12 includes a front face 104. A pair of upper and lower flanges 106, 108, respectively, extends generally horizontally rearward from respective upper and lower edge margins of the bracket 12. Lips (or return flanges) 110, 112 extend from the respective flanges 106, 108 generally toward each other. As seen in FIGS. 8 and 9, the box mounting clip 10 receives the stud mounting bracket 12 between the top and bottom flanges 36, 40 and engages the rear face of the stud mounting bracket 12 (e.g., the lips 110, 112) to mount the junction box 14 to the front face of the stud mounting bracket. It is understood that the clip 10 can be used with other brackets or devices, and the stud mounting bracket 12 is shown for reference to illustrate use of the clip 10.

As shown in FIGS. 7-9, the top and bottom flanges 36, 40 are configured to clip onto the telescoping bars 100, 102 of the stud mounting bracket 12. For example, the top and bottom flanges 36, 40 can be resiliently deflected to clip onto the stud mounting bracket 12. When the clip 10 is mounted on the stud mounting bracket 12, the top flange 36 extends above the upper flange 106 of the stud mounting bracket 12 in generally opposed relation therewith, and the bottom flange 40 extends below the lower flange 108 of the stud mounting bracket in generally opposed relation therewith. Thus, the stud mounting bracket 12 is positioned between the top and bottom flanges 36, 40 of the clip 10, thereby securing the clip to the stud mounting bracket. Optionally, the top flange 36 of the clip 10 engages the upper flange 106 of the stud mounting bracket 12. Optionally, the bottom flange 40 of the clip 10 engages the lower flange 108 of the stud mounting bracket 12. The clip 10 can be positioned at any location along the stud mounting bracket 12 and easily moved (e.g., by sliding along the stud mounting bracket) because no fasteners are necessary to attach the clip to the stud mounting bracket. If the top and bottom flanges 36, 40 are discontinuous, as illustrated, each of the legs 74, 76, 84, 86 can be independently movable (e.g., resiliently deflectable). Because each leg 74, 76, 84, 86 is independently movable, the clip 10 can be positioned entirely on the outer telescoping bar 102, be positioned entirely on the inner telescoping bar 100, or straddle the outer and the inner bars of the stud mounting bracket 12.

When the box mounting clip 10 is attached to the stud mounting bracket 12, the positioning tabs 50, 52 are positioned between the lips 110, 112 (see FIG. 8). An upper portion of the base 20 adjacent the upper edge margin 22 engages the lip 110. A lower portion of the base 20 adjacent the lower edge margin 24 engages the lip 112. If force is applied to the clip 10 (e.g., if the junction box 14 is contacted during installation of dry wall), one or both of the positioning tabs 50, 52 (e.g., the upper and/or lower surfaces 62, 64, 66, 68) will contact one or both of the lips 110, 112 to prevent the clip (and thus the junction box) from rotating relative to the stud mounting bracket 12. Optionally, the upper surface 62, 64 of each positioning tab 50, 52 engages a lower margin of the lip 110 and the lower surface 66, 68 of each positioning tab engages an upper margin of the lip 112 to retain the clip 10 on the stud mounting bracket 12.

Referring to FIG. 9, a junction box 14 is attached to the box mounting clip 10, and therefore to the stud mounting bracket 12, by fasteners (e.g., standard self-tapping sheet metal screws, not shown) extending through the junction box (e.g., through openings in a back wall of the junction box) and through one or more openings 44, 46, 90, 92 of the clip. The junction box 14 can be attached to the clip using at least one of the openings 44, 46 in the attachment flanges, 38, 42, at least one or more of the openings 90, 92 in the mounting tabs 72, 82, or any combination thereof. Typically, the junction box 14 is attached to the clip using at least two of the openings 44, 46, 90, 92. The clip 10 can be sold and shipped to customers separately or as part of an assembly, such as a pre-assembled electrical unit, or as part of a kit. In one embodiment, a stud mounting bracket assembly includes a stud mounting bracket 12, the clip 10 as described above, and a junction box 14 for attachment to the stud mounting bracket. The junction box 14 can be attached to the stud mounting bracket as-sold. Alternatively, the stud mounting bracket 12, clip 10, and junction box 14 can be sold together as a kit for assembly by the user. In another embodiment, the clip 10 and junction box 14 can be sold together. In yet another embodiment, a stud mounting bracket assembly includes the stud mounting bracket 12 and the clip 10. Other configurations and assemblies are within the scope of the present invention.

The box mounting clip 10 as described above is versatile and permits a user to position a junction box 14 at any desired location and angle on a stud mounting bracket 12 to receive the necessary type of electrical and/or data communication device or cables. The box mounting clip 10 also prevents rotation of the mounted junction box 14 relative to the stud mounting bracket 12 due to forces applied during construction or installation.

Having described embodiments of the invention in detail, it will be apparent that modifications and variations are possible without departing from the scope of the invention defined in the appended claims.

When introducing elements of the illustrated embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A stud mounting bracket assembly comprising:
   a stud mounting bracket comprising a front face, a rear face, an upper edge margin, a lower edge margin, an upper flange extending rearward from the upper edge margin, a lower flange extending rearward from the lower edge margin, a first lip extending downward from the upper flange and a second lip extending upward from the lower flange; and
   a box mounting clip for mounting a junction box on the stud mounting bracket, the box mounting clip comprising:
      a base having a front face, a rear face, an upper edge margin, a lower edge margin, a left edge margin, and a right edge margin;
      a top flange extending forward from the upper edge margin and a bottom flange extending forward from the lower edge margin, the top and bottom flanges configured to receive the stud mounting bracket therebetween; and
      a left positioning tab positioned between the top and bottom flanges and extending generally forward from the left edge margin of the base at an angle and a right positioning tab positioned between the top and bottom flanges and extending generally forward from the right edge margin of the base at an angle, the left and right positioning tabs configured to engage at least one lip of the stud mounting bracket to prevent rotation of the box mounting clip relative to the stud mounting bracket when the stud mounting bracket is received between the top and bottom flanges.

2. The stud mounting bracket assembly as recited in claim 1, wherein the box mounting clip further comprises an upper attachment flange extending upward from the top flange and a lower attachment flange extending downward from the bottom flange, the upper and lower attachment flanges being configured for attachment to a junction box to mount the junction box on the stud mounting bracket.

3. The stud mounting bracket assembly as recited in claim 2, wherein the top flange comprises left and right legs extending forward from the upper edge margin of the base and the bottom flange comprises left and right legs extending forward from the lower edge margin of the base, the left and right legs of each of the top and bottom flanges being independently movable relative to the base, the box mounting clip further comprising an upper mounting tab extending upward from the upper margin of the base between the left and right legs of the top flange and a lower mounting tab extending downward from the lower margin of the base between the left and right legs of the bottom flange.

4. The stud mounting bracket assembly as recited in claim 1, in combination with a junction box secured to the stud mounting bracket by the box mounting clip.

5. The stud mounting bracket assembly as recited in claim 1, wherein the positioning tabs and the base are configured to be positioned adjacent the rear face of the stud mounting bracket.

* * * * *